United States Patent
Singh

(10) Patent No.: US 8,279,753 B2
(45) Date of Patent: Oct. 2, 2012

(54) EFFICIENT DETERMINATION OF FAST ROUTES WHEN VOLUMINOUS DATA IS TO BE SENT FROM A SINGLE NODE TO MANY DESTINATION NODES VIA OTHER INTERMEDIATE NODES

(75) Inventor: Ajay Kumar Singh, New Delhi (IN)

(73) Assignee: Oracle International Corporation, Redwood Shores, CA (US)

( * ) Notice: Subject to any disclaimer, the term of this patent is extended or adjusted under 35 U.S.C. 154(b) by 857 days.

(21) Appl. No.: 11/678,618

(22) Filed: Feb. 25, 2007

(65) Prior Publication Data

US 2008/0170510 A1    Jul. 17, 2008

(30) Foreign Application Priority Data

Jan. 11, 2007    (IN) .............................. 67/CHE/2007

(51) Int. Cl.
    *H04J 1/16*    (2006.01)
(52) U.S. Cl. .................... 370/229; 370/254; 370/351
(58) Field of Classification Search .................. 370/254, 370/255, 351
    See application file for complete search history.

(56) References Cited

U.S. PATENT DOCUMENTS

| | | | |
|---|---|---|---|
| 2003/0099235 A1* | 5/2003 | Shin et al. ...................... | 370/390 |
| 2006/0147204 A1* | 7/2006 | Yasukawa et al. .............. | 398/26 |
| 2008/0310340 A1* | 12/2008 | Isozu ............................ | 370/328 |

OTHER PUBLICATIONS

"Shu Tao, Kuai Xu, Antonio Estepa, Teng Fei, Lixin Gao, Roch Guerin, Jim Kurose, Don Towsley, and Zhi-Li Zhang", "Improving VOIP Quality Through Path Switching", to Appear in Proceedings of IEEE Infocom, Miami, Mar. 2005, pp. 2268-2278.

"M. Adler, R. Kumar, K. Ross, D. Rubenstein, Torsten Suel and D. Yao", "Optimal Peer Selection for P2P Downloading and Streaming", IEEE INFOCOM Conference, Mar. 2005, pp. 1538-1549.

"Reza Rejaie", "A Framework for Architecting Peer-to-Peer Receiver-Driven Overlays", Proceedings of the 14th International Workshop on Network and Operating Systems Support for Digital Audio and Video (Nossdav), 2004, pp. 42-47.

"John W. Byers, Jeffrey Considine, Michael Mitzenmacher, Stanislav Rost", "Informed Content Delivery Across Adaptive Overlay Networks", IEEE/ACM Transactions on Networking, Oct. 2004, pp. 767-780.

"Adolfo Rodriguez, Dejan Kostic and Amin Vahdat", "Scalability in Adaptive Multi-Metric Overlays", Proceedings of the International Conference on Distributed Computing Systems (ICDCS), Mar. 2004, pp. 1-10.

"Shu Tao and Roch Guerin", "Application-Specific Path Switching: A Case Study for Streaming Video", In Proceedings of ACM Multimedia, New York, Oct. 2004, pp. 136-143.

(Continued)

*Primary Examiner* — Ayaz Sheikh
*Assistant Examiner* — Mounir Moutaouakil
(74) *Attorney, Agent, or Firm* — Narendra Reddy Thappeta

(57) ABSTRACT

Determination of a fast route from a source node to many destination nodes. Identities of each node, and bandwidths and latencies of paths are received. A threshold bandwidth is set, and routes containing paths among nodes which have an associated bandwidth exceeding the threshold bandwidth (or within a desired range, in general) are determined. The route providing the least latency among the routes thus determined is selected. The process is repeated for other values of threshold bandwidths, and the fastest route is then determined from the routes selected for each value of threshold bandwidth considered.

11 Claims, 8 Drawing Sheets

OTHER PUBLICATIONS

"Shu Tao, Kuai Xu, Ying Xu, Teng Fei, Lixin Gao, Roch Guerin, Jim Kurose, Don Towsley, and Zhi-Li Zhang", "Exploring the Performance Benefits of End-to-End Path Switching", In Proceedings of ACM Sigmetrics/Performance (Extended Abstract), New York, Jun. 2004, pp. 418-419.

"Ahmed Abd El Al, Tarek Saadawi, Myung Lee", "Improving Interactive Video in Ad-Hoc Networks Using Path Diversity", The 1st IEEE International Conference on Mobile Ad-Hoc and Sensor Systems, Oct. 24-27, Fort Lauderdale, Florida, USA, 2004, pp. 369-378.

"Mengkun Yang and Zongming Fei", "Proactive Approach to Reconstructing Overlay Multicast Trees", IEEE Infocom 2004, pp. 1-11.

"Minseok Kwon and Sonia Fahmy", "Path-Aware Overlay Multicast", Computer Networks, Elsevier, Jun. 2004, pp. 1-27.

"Shuju Wu, S. Banerjee, Xiaobing Hou, R.A. Thompson", "Active Delay and Loss Adaptation in Overlay Multicast Tree", Proc. of IEEE 2004, Jun. 2004, pp. 2014-2018.

"Eli Brosh and Yuval Shavitt", "Approximation and Heuristic Algorithms for Minimum Delay Application-Layer Multicast Trees", Proc. of IEEE Infocom 2004, Mar. 2004, pp. 1-11.

"S. Birrer and F.E. Bustamante", "Resilient Peer-to-Peermulticast From the Ground Up", Proc. of 3rd IEEE NCA, 2004, pp. 1-5.

"Ying Zhu, Baochun Li, and Jiang Guo", "Multicast With Network Coding in Application-Layer Overlay Networks", IEEE Journal on Selected Areas in Communications, vol. 22, No. 1, Jan. 2004, pp. 107-120.

"Xiaoxiang Lu, Shu Tao, Magda El Zarki, and Roch Guerin", "Quality-Based Adaptive Video Over the Internet", In Proceedings of CNDS, Orlando, FL, Jan. 2003, pp. 1-10.

"Jianping Wang, Hao Wang, Qiong Zhang, and Biao Chen", "Routing for MPEG4 FGS Multimedia Stream Transmission Over Ad Hoc Networks",. 2nd IASTED International Conference on Communications, Internet and Information Technology, Scottsdale, Arizona, Nov. 2003, pp. 1-4.

"T. Nguyen and A. Zakhor", "Path Diversity With Forward Error Correction System for Packet Switched Networks", IEEE Infocom, pp. 663-672, Apr. 2003, pp. 663-672.

"Zhi Li and Prasant Mohapatra", "Hostcast: A New Overlay Multicast Protocol", IEEE ICC 2003, pp. 1-5.

"T. S. Eugene Ng, Yang-Hua Chu, Sanjay G. Rao, Kunwadee Sripanidkulchai, Hui Zhang", "Measurement-Based Optimization Techniques for Bandwidth-Demanding Peer-to-Peer Systems", IEEE Infocom 2003, pp. 1-11.

"J. Chakareski, E. Setton, Y. J. Liang, and B. Girod", "Video Streaming With Diversity". Invited paper, Proceedings IEEE International Conference on Multimedia and Expo, vol. 1, pp. 9-12, Baltimore, MD, Jul. 2003, pp. I-9-I-12.

"E. Setton, Y. J. Liang and B. Girod", "Adaptive Multiple Description Video Streaming Over Multiple Channels With Active Probing". Proceedings IEEE International Conference on Multimedia and Expo, vol. 1, pp. 509-512, Baltimore, MD, Jul. 2003 pp. I-509-I-512.

"V. Padmanabhan, H. Wang, P. Chou", "Resilient Peer-to-Peer Streaming", Proc. of IEEE ICNP, Nov. 2003, pp. 1-12.

"Suman Banerjee, Christopher Kommareddy, Koushik Kar, Bobby Bhattacharjee, and Samir Khuller", "Construction of an Efficient Overlay Multicast Infrastructure for Real-Time Applications",IEEE Infocom 2003, Apr. 2003, pp. 1-11.

Sherlia Y. Shi and Jonathan S. Turner, "Routing in Overlay Multicast Networks",Proc. of IEEE INFOCOM 2002, Jun. 2002, pp. 1200-1208.

"David A Helder, Sugih Jamin", "End-Host Multicast Communication Using Switch-Trees Protocols", ACM 2002, pp. 1-6.

"Beichuan Zhang, Sugih Jamin, and Lixia Zhang", "Host Multicast: A Framework for Delivering Multicast to End Users", IEEE INFOCOM 2002, pp. 1366-1375.

"M. Castro, P. Druschel, A. Kermarrec, and A. Rowstron", "Scribe: A Large-Scale and Decentralized Application-Level Multicast Infrastructure", In IEEE Journal on Selected Areas in Communications vol. 20 No. 8, Oct. 2002, pp. 100-110.

"Suman Banerjee, Bobby Bhattacharjee", Christopher Kommareddy, "Scalable Application Layer Multicast", Proceedings of the 2002 conference on Applications, technologies, architectures, and protocols for computer communications, Aug. 2002, pp. 1-13.

"H. Deshpande, M. Bawa, and H. Garcia-Molina", "Streaming Live Media Over Peers", Stanford Univ., Database Group, Submitted for publication, 2002, Paper ID: 620, No. of pp. 14.

"Wenjie Wang, David Helder, Sugih Jamin, and Lixia Zhang", "Overlay Optimizations for End-Host Multicast", Proc. of NGC 2002, Oct. 2002, pp. 1-8.

"David A. Helder, Sugih Jamin", "End-Host Multicast Communication Using Switch-Tree Protocols", Proceedings of the 2nd IEEE/ACM International Symposium on Cluster Computing and the Grid, 2002, pp. 1-6.

"V.N. Padmanabhan, K. Sripanidkulchai", "The Case for Cooperative Networking", Proceedings of the First International Workshop on Peer-to-Peer Systems (IPTPS), Mar. 2002, pp. 1-7.

"Dimitrios Pendarakis,Sherlia Shi, Dinesh Verma, and Marcel Waldvogel", "ALMI: An Application Level Multicast Infrastructure". Proc. of the 3rd USNIX Symposium on Internet Technologies and Systems, Mar. 2001, pp. 1-12.

Y. J. Liang, E. G. Steinbach, and B. Girod, "Real-Time Voice Communication Over the Internet Using Packet Path Diversity". Proceedings ACM Multimedia 2001, pp. 431-440, Ottawa, Canada, Sep./Oct. 2001, pp. 1-10.

"Chu, S. G. Rao, S. Seshan, and H. Zhang", "Enabling Conferencing Applications on the Internet Using an Overlay Multicast Architecture". Proc. of the ACM SIGCOMM, Aug. 2001, pp. 55-67.

"David G. Andersen, Hari Balakrishnan, M. Frans Kaashoek, Robert Morris", "Resilient Overlay Networks", Proc. of 18th ACM SOSP, Banff, Canada, Oct. 2001, pp. 1-15.

"R. G. Cole, J. H. Rosenbluth", "Voice Over IP Performance Monitoring". ACM SIGCOMM Computer Communication Review, v.31 n.2, Apr. 2001, pp. 9-24.

"P. Francis", "Yoid: Extending the internet multicast architecture", Apr. 2000 (Unpublished), pp. 1-40.

"J. Jannotti, D. Gifford, K. Johnson, M. Kaashoek, and J. Otoole","Overcast:Reliable Multicasting With an Overlay Network", Proceedings of the Fourth Symposium on Operating Systems Design and Implementation, pp. 197212, Oct. 2000, pp. 1-16.

"Yang-Hua Chu, Sanjay G. Rao, and Hui Zhang", "A Case for End System Multicast". Proc. of ACM SIGMETRICS 2000, Jun. 2000, pp. 1-12.

"Y. Chawathe", "Scattercast: An Architecture for Internet Broadcast Distribution As an Infrastructure Service" PhD Thesis, University of California, Berkeley, 2000, [VS-DCU] Virtual Screen and DCUs. doc, [DS-CLB] Design Specification for iMeeting Windows Collaboration Protocol, pp. 1-161.

\* cited by examiner

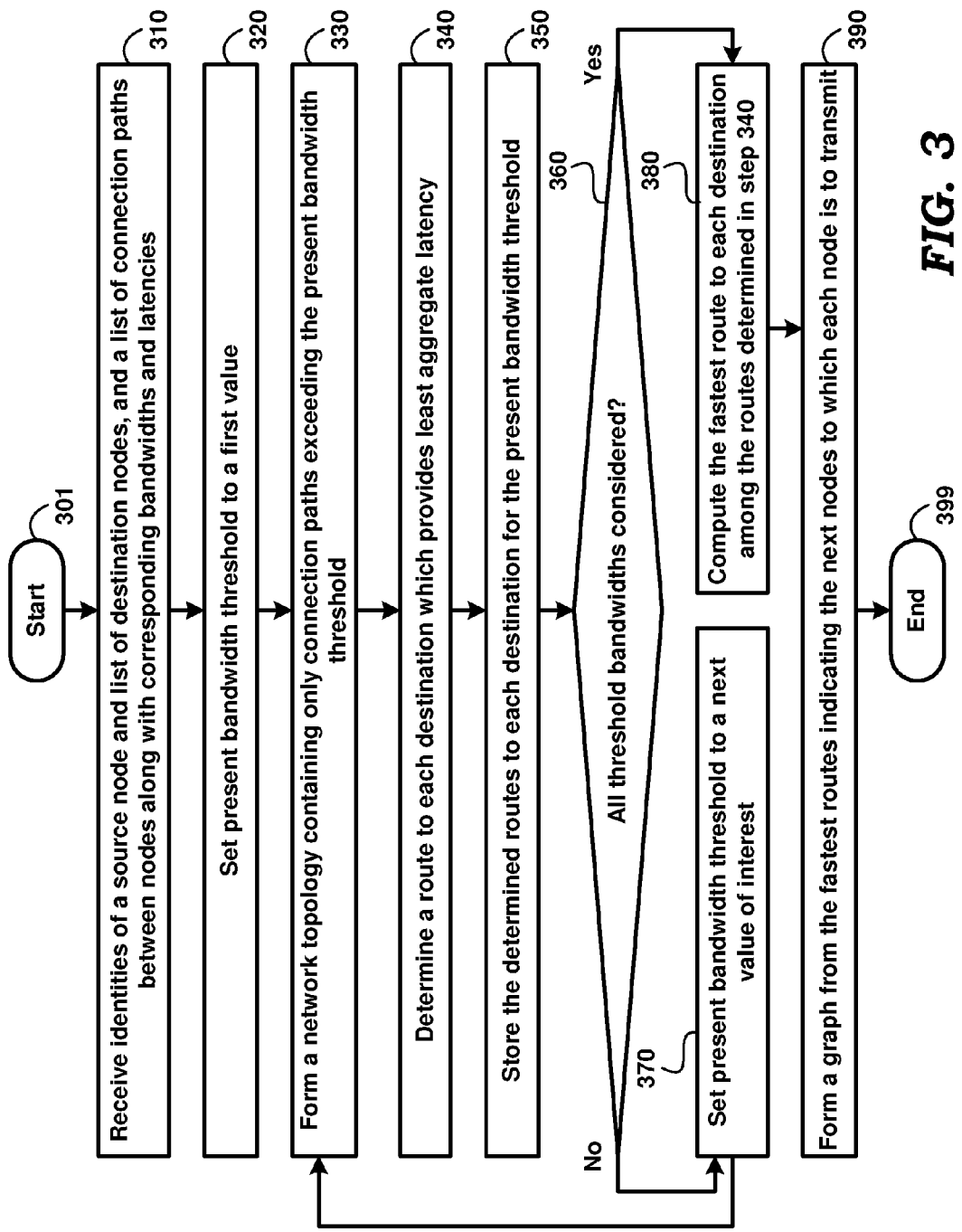

EFFICIENT DETERMINATION OF FAST ROUTES WHEN VOLUMINOUS DATA IS TO BE SENT FROM A SINGLE NODE TO MANY DESTINATION NODES VIA OTHER INTERMEDIATE NODES

RELATED APPLICATIONS

The present application is related to and claims priority from the co-pending India Patent Application entitled, "Efficient Determination Of Fast Routes When Voluminous Data Is To Be Sent From A Single Node To Many Destination Nodes Via Other Intermediate Nodes", Serial Number: 67/CHE/2007, Filed: Jan. 11, 2007, docket number: ORCL-044/India, naming the same inventors as in the subject patent application, and is incorporated in its entirety herewith.

BACKGROUND

1. Field

The present disclosure relates generally to computer networks, and more specifically to efficient determination of fast routes when voluminous data is to be sent from a single node to many destination nodes via other intermediate nodes.

2. Related Art

There is often a need to determine routes from a source node to several destination nodes. For example, a presenter of a seminar may use a digital processing system (source node) to transmit data to multiple digital processing systems (destination nodes) used by various attendees on a network. To transfer the data from the source node to the destination nodes, it may be desirable to determine routes from the source node to the destination nodes.

Data to be delivered from a source node to destination nodes may be sent over a route spanning one or more intermediate nodes and paths connecting the nodes. For example, a source node may send data to a first destination node via a first path (in which case the path is the route), which may then forward the received data to one or more other destination nodes via corresponding paths. The route to such other destination nodes would thus contain the first destination node, the first path as well as the corresponding path(s) to the corresponding destination node.

It is desirable to determine routes which are fast (i.e., complete data transfer quickly) from a source node to all the destination nodes. In the case a seminar needs to be interactive, each recipient may need to receive the presented data quickly so that the recipient can quickly present a question or a comment. Similarly, there could be other types of applications (e.g., games, financial applications, bids, etc.), which require that the data be delivered in close to real-time to the extent possible.

Such a requirement may be present in several instances when voluminous (large amount) data is to be transmitted from a source node to multiple destination nodes.

BRIEF DESCRIPTION OF THE DRAWINGS

The present invention will be described with reference to the following accompanying drawings, which are described briefly below.

FIG. (FIG.) 1 is a block diagram of an example environment in which several aspects of the present invention can be implemented.

FIG. 3 is a flowchart illustrating the manner in which fast paths are determined between a source node and destination nodes in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Overview

According to an aspect of the present invention, identities of a source node, a destination node and intermediate nodes, a list of paths interconnecting the nodes, and bandwidths and latencies of the paths are received. A network topology containing a set of paths exceeding a threshold bandwidth is formed, and a least-latency route is determined from among the routes between the source node and the destination node. Each of such determined routes is stored as potential route to the corresponding destination node.

Many such potential routes may be determined to each node by forming network topologies for corresponding threshold bandwidths. The fastest route (among the potential routes) between the source node and the destination node is determined by estimating a total time to transfer an amount of data for each of the least-latency (potential) routes thus determined, and selecting the route which requires the shortest time to transfer.

While the example of above is described while selecting the respective network topology based on bandwidth and then determining the potential route to minimize latency, it should be appreciated that the network topology may be based first on a threshold latency and then determining the potential routes having maximum bandwidths.

As the computation of potential routes is based on a single variable, the computational complexity in determining the potential routes to each destination node is minimized. Such a feature may be of desired when the fastest route to a large number of nodes is to be determined.

The approach may also be reasonably effective in providing fastest paths since both bandwidth and latency are considered. The latency is relevant because several networking applications use flow control mechanisms where the throughput performance (speed of transfer) is constrained by the latency in the underlying path. The bandwidth is also relevant since bandwidth indicates the number of bits that can be transferred on a path in unit time.

Though the topology is described as being selected on a threshold bandwidth, it should be appreciated that any desired range (with lower and upper thresholds) can be used instead. The range can be calculated based on the bandwidth value of links in the network.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

Example Environment

Figure 1:
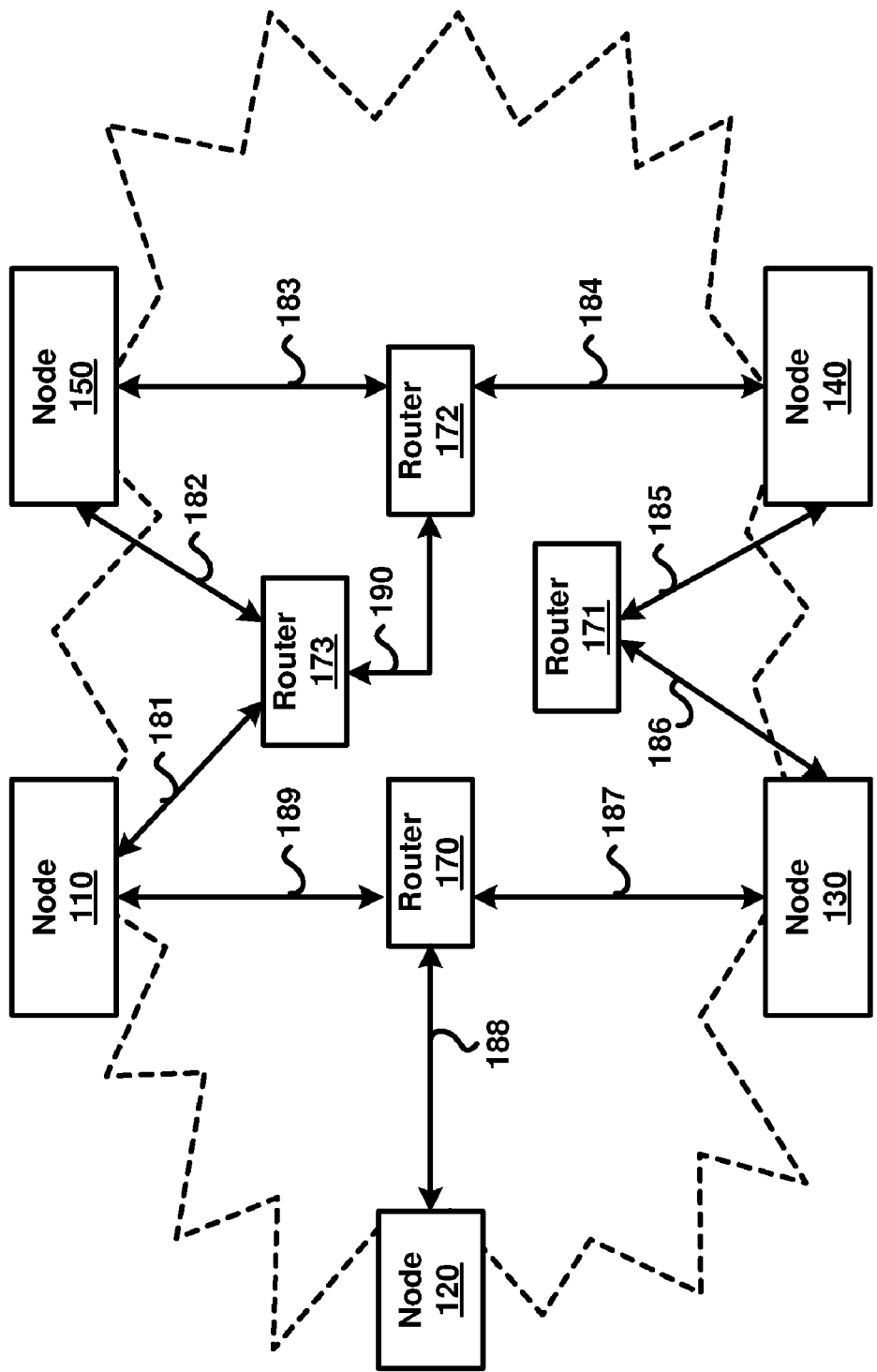

FIG. 1 is a block diagram of an example environment in which several aspects of the present invention can be implemented. The diagram is shown containing nodes 110, 120, 130, 140 and 150 communicatively coupled to each other by routers 170-173.

Router 170 is shown connected to node 120 via communication link 188, to node 110 via communication link 189, and to node 130 via communication link 187. Router 171 is shown connected to node 130 via communication link 186, and to node 140 via communication link 185. Router 172 is shown connected to node 150 via communication link 183, and to node 140 via communication link 184. Router 173 is shown connected to node 110 via communication link 181, to node 150 via communication link 182, and to router 172 via communication link 190. Each communication link provides communication between two systems (routers, nodes), without other systems in between. For simplicity of illustration, it is assumed that each router merely supports unicast transmissions (and not multicasts or broadcasts to multiple nodes/systems).

Each of nodes 110, 120, 130, 140 and 150 may be a data processing node (with a unique IP address) such as a computer, and may transmit/receive data to/from the other nodes. In addition, each node may operate as a relay node in that the data received from one node is forwarded to other nodes. In such a scenario, the received data is re-packaged with the IP address of the destination node (in the destination address field of IP packets) and resent as a new unicast transmission. The unicast transmission is repeated for each of the destination nodes to which the transmissions are to be relayed.

As an illustration, in a seminar (based on high definition video, etc.), a presenter may use node 120 to transmit data to attendees who receive the data at respective (attendee) nodes 130, 140 and 150. Node 110 may represent a conference server which provides various coordination utilities (e.g., scheduling, logging into the same conference, etc.) and may also receive various transmitted data along with attendees and thus is treated as an attendee node in the description below.

It may be appreciated that huge volumes of data may need to be transferred from (presenter/source) node 120 to (attendee) nodes 110, 130, 140 and 150. When the seminar needs to be interactive, attendee nodes 110, 130, 140 and 150 may also generate questions/comments that may be needed to be transmitted to presenter node 120. At least for such a reason it may be desirable to have such interactions in as close to real time as possible.

To provide such close to real time interactions, it is desirable to send data (including when the volume is huge) quickly to each of the recipient nodes. Source node 120 may be designed to unicast to each of the attendees. However, such an approach may lead to excessive transmissions on the network in addition to not completing data transfers to several attendee nodes quickly.

Accordingly it may be advantageous to have any intermediate systems (routers and nodes) serve as relay agents to other agents such that the data is delivered quickly to all the nodes. Assuming that routers (170-173) do not provide such a relay, and all the nodes are designed to provide relay according to some pre-specified convention as noted above, it is desirable to analyze the nodes and links to determine the optimum path to deliver data to each of the recipient nodes. If a router provides multi-casting option to desired ones of the nodes (after receiving data), the router also may be viewed as a node.

An overlay network (network built on top of one or more base networks and defining logical paths between two end systems based on one or more underlying links of the base networks) may be used for such as a purpose as described below.

Overlay Network

Figure 2:
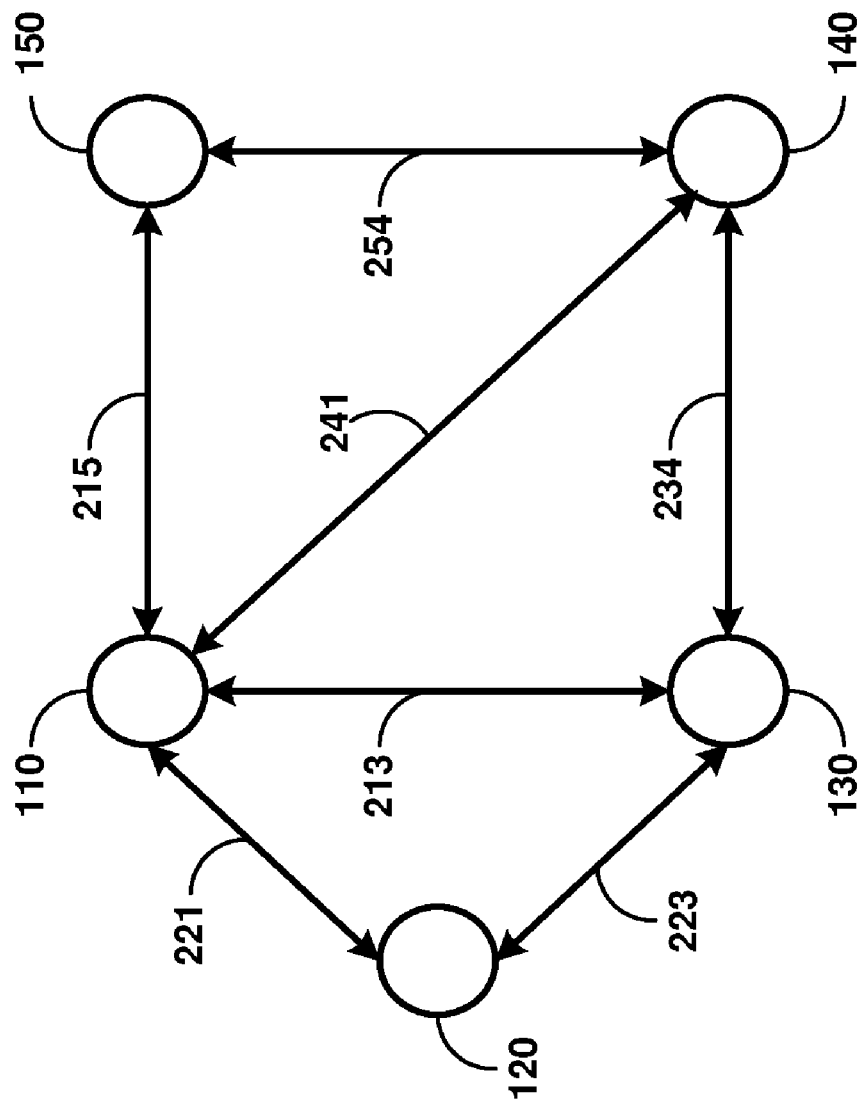
FIG. 2 is an overlay network based on a base network in one embodiment.

FIG. 2 is an overlay network depicting topologically the paths among nodes 110, 120, 130, 140 and 150 of FIG. 1. The nodes are shown interconnected by paths 221, 223, 213, 215, 234, 241 and 254.

With reference to FIGS. 1 and 2, path 221 contains (represents) links 188 and 189 via router 170. Similarly, path 223 contains links 187 and 188 via router 170. Path 213 contains links 187 and 189 via router 170. Path 215 contains links 181 and 182 via router 173. Path 234 contains links 185 and 186 via router 171. Path 241 contains links 181, 190 and 184 via routers 172 and 173. Path 254 contains links 183 and 184 via router 172. Each path represents the logical path provided by the routers (without nodes in between) using the corresponding links, as will be clear from the description below.

Node 120 is shown communicatively coupled to node 110 via path 221, wherein path 221 is formed by links 188 and 189 along with router 170. Similarly, node 120 is shown communicatively coupled to node 130 via path 223. Node 130 is shown communicatively coupled to node 110 via path 213 and to node 140 via path 234. Node 140 is communicatively coupled to nodes 110 and 150 via paths 241 and 254 respectively, and node 150 is communicatively coupled to node 110 via path 215. Nodes 110, 120, 130, 140 and 150 may communicate with each other in a peer-to-peer fashion.

Each of paths 221, 223, 213, 215, 234, 241, and 254 is associated with a bandwidth and latency. Bandwidth of a path is generally the maximum amount of raw data that can be transmitted per second on the path, and thus each path may be viewed as having an associated bandwidth equal to the lesser of the bandwidths associated with underlying links. Thus path 221 may be viewed as having the lesser of bandwidths on links 188 and 189 (shown in FIG. 1). However, in the computations below, bandwidth can be approximated by other meaningful approaches, as suited for the specific environment.

Latency may represent the delay to transfer a bit from a node at one end of a path to the node at the other end of the path, and may equal the sum of latencies of individual underlying links and any processing delay in the intermediate switches. Thus, the latency of path 221 can be computed to equal the sum of the latencies on links 188 and 189, and any delay encountered due to processing in router 170. However, any reasonable approach may be used for approximate determination, as suited for the specific environment.

In an embodiment, latency is measured by determining the round-trip time on a path, and dividing the round-trip time by 2. The round trip time may be measured, for example, by sending a small ICMP Echo packet (e.g., in the form of a Ping command) from a node to a target, which then responds with a similarly minimal packet. As an illustration, the latency of link 188 may be measured by sending an ICMP packet from node 120 to router 170, receiving a response packet from router 170, measuring the time taken for the round-trip, and dividing the round trip time by two.

It may also be noted that a route from a source node to a destination node may contain one or more intermediate nodes, i.e., a source node may be connected to a destination node by a network of intermediate nodes. For example, with reference to FIG. 2, node 120 is connected to node 150 by a network formed by intermediate nodes 110, 130 and 140 and corresponding paths.

Thus, some possible routes on which data transfer between nodes 120 and 150 could take place are:

node 120-path 221-node 110-path 215-node 150,
node 120-path 221-node 110-path 213-node 130-path 234-node 140-path 254-node 150,
node 120-path 221-node 110-path 241-node 140-path 254-node 150,
node 120-path 223-node 130-path 234-node 140-path 254-node 150,
node 120-path 223-node 130-path 213-node 110-path 215-node 150, and
node 120-path 223-node 130-path 213-node 110-path 241-node 140-path 254-node 150.

Similarly, several possible routes may be present between the source node 120 and each of the other destination nodes 130, 140, 150, and 110, with each route offering corresponding combination of bandwidth and latency, which affects how fast large amounts of data are delivered to the corresponding destination node.

Fast paths between presenter node 120 and attendee nodes 110, 130, 140 and 150 may be determined according to various aspects of the present invention as described in detail below. While in the description below it is assumed that various operations to make such a determination are performed in (conference server) node 110, it must be understood that the operations may be performed in any of the other nodes, or even external to the nodes in some other system (not shown).

Determining Fast Paths

FIG. 3 is a flowchart illustrating the manner in which (server) node 120 determines fast paths between node 120 and each of nodes 110, 130, 140 and 150 according to various aspects of the present invention. The flowchart starts in step 301, in which control passes immediately to step 310.

In step 310, node 110 receive identifiers (e.g., IP addresses or URLs) of source node (node 120), a list of destination nodes (nodes 110, 130, 140 and 150), and a list of paths between nodes along with the bandwidths and latencies of the paths. With respect to FIG. 2, node 110 receives a list of paths 221, 223, 213, 234, 241, 254 and 215, along with the bandwidth and latency of each of those paths. Node 110 may create an overlay graph (as shown in FIG. 2) of the nodes and interconnections. Control then passes to step 320.

In step 320, node 110 sets a threshold bandwidth (to be used in relevant steps below) to a current (first) value. In one embodiment, node 110 selects a set of threshold bandwidths to be used from the list of bandwidths of paths received in step 310. The threshold bandwidths may be selected such that operations in steps below as also the total number of iterations needed to converge to a solution are optimized while still having a reasonable probability that a desired level of accuracy is maintained.

For example, all the reported bandwidth value can be sorted in increasing order (B1<B2<...<Bmax) where B1 is the minimum reported bandwidth and Bmax is the maximum reported bandwidth. Initially bandwidth threshold can be set to 0 (the first threshold value) to consider all paths and in successive steps threshold is set to B1, next B2, next B3 till Bmax is reached. In another embodiment, node 110 initially sets a current value for the threshold bandwidth, and in successive iterations adaptively sets new values of threshold bandwidths to be considered. In yet another embodiment, only some of the reported bandwidth values (B1, B3, etc.) are set to the threshold bandwidth values. Control then passes to step 330.

In step 330, node 110 forms a network topology containing nodes 110, 120, 130, 140 and 150, but selecting only those paths having a bandwidth greater than the current value set for the threshold bandwidth. Some of the topologies may not connect all the nodes. The operation of step 330 is illustrated with several examples in sections below. Control then passes to step 340.

In step 340, node 110 determines from the network topology obtained in step 330 a route from presenter node 120 to each of attendee nodes 110, 130, 140 and 150 which provides least aggregate latency (sum of the latencies of the paths comprised in the route). As an illustration, node 110 may determine that the route comprising paths 223 and 234 provides least aggregate latency (sum of latencies of paths 223 and 234) among all possible routes between node 120 and node 140. In an embodiment, node 110 employs the Dijkstra's single source shortest path algorithm (described, for example, in a document entitled, "Dijkstra's algorithm", by Paul E. Black, in Dictionary of Algorithms and Data Structures [online], U.S. National Institute of Standards and Technology. 20 Sep. 2006) to determine the least-aggregate-latency paths. Control then passes to step 350.

In step 350, node 110 stores the corresponding least-aggregate-latency route from presenter node 120 to each of destination nodes 110, 130, 140 and 150) determined in step 340 above for the current value of the threshold bandwidth. Control then passes to step 360.

In step 360, if all threshold bandwidths have been considered, control passes to step 380, otherwise control passes to step 370.

In step 370, the value of the threshold bandwidth is set to a next value of interest. Control then passes to step 330.

In step 380, node 110 computes the fastest route from source node 120 to each destination node 110, 130, 140 and 150 from the corresponding routes determined in each iteration of step 340. In one embodiment node 110 applies the following formula to estimate (or generate a metric representing) the time taken for each route:

$$T = \sum_{i=1}^{k} \text{latency}(i) + \frac{\text{Size}}{\text{Bottleneck\_BW}} + \sum_{j=1}^{k-1} \text{relaying\_delay}(j) \qquad \text{Equation 1}$$

wherein:

T=the total time to transfer data of size "Size"

i=an iteration index running from 1 to k, where k is the number of paths in the route.

latency(i)=the latency associated with the path 'i'.

Size=average size of data(or information unit in general) to be transmitted from source node to destination node.

Bottleneck_BW=the least of the bandwidths of paths 1 through k.

relaying_delay (j)=delay at jth intermediate node due to relaying of data from incoming link to outgoing link It may be noted that Equation 1 may be modified as suited for specific environments. For example, the relaying delay may be set to zero to simplify computations.

Node 110 estimates the value of the Total time 'T' for each (least aggregate latency) route between a source node and a destination node determined in successive iterations of step 340 (corresponding to different values of a threshold bandwidth). Node 110 then selects the route which provides the minimum value for 'T' according to equation 1. Control then passes to step 390.

In step 390, node 110 forms a graph (data dissemination graph) containing the fastest routes determined from node 120 (source node) to each destination node. Node 110 may then forward the data dissemination graph to each of nodes 120, 130, 140 and 150, along with instructions to each node to forward data (to a next node) according to the fastest routes. Alternatively, node 110 may determine the common route segments for different destination nodes, and provide specific instructions at the end of such segments to unicast to the destination nodes sharing the segment. Control then passes to step 399 in which the flowchart ends.

It must be understood that the operations of the flowchart of FIG. 3 may be performed repeatedly in node 110. For example, in order that determination of fast routes is optimized, each of nodes 120, 130, 140 and 150 (as well as node 110 itself) may monitor existing paths, update the bandwidth and latency of each path, discover new paths, and provide updated information to node 110. Node 110 may then perform the operations of the flowchart of FIG. 3 again to determine the routes. Further, node 110 may also set values of threshold bandwidth adaptively, for example, based on any updated information regarding new paths, updated bandwidths and latencies of paths, etc.

In addition, as the fastest routes also depend on the Size of the data to be transferred, different graphs may be computed for different sizes and used accordingly.

In the flowchart described above, operations (of each iteration) of steps 330, 340 and 345 have been described as being performed for a current value of a threshold bandwidth, while determining routes to each destination node which provide least aggregate delay. As bandwidths generally have discrete values (T1, T3, etc.), the selection of bandwidth threshold in step 320 is simplified. However, it must be understood that steps 330, 340 and 350 may also be performed by setting a desired (current) value for least aggregate delay (steps 320 and 370), and determining routes which provide maximum bandwidth.

Figure 4A:
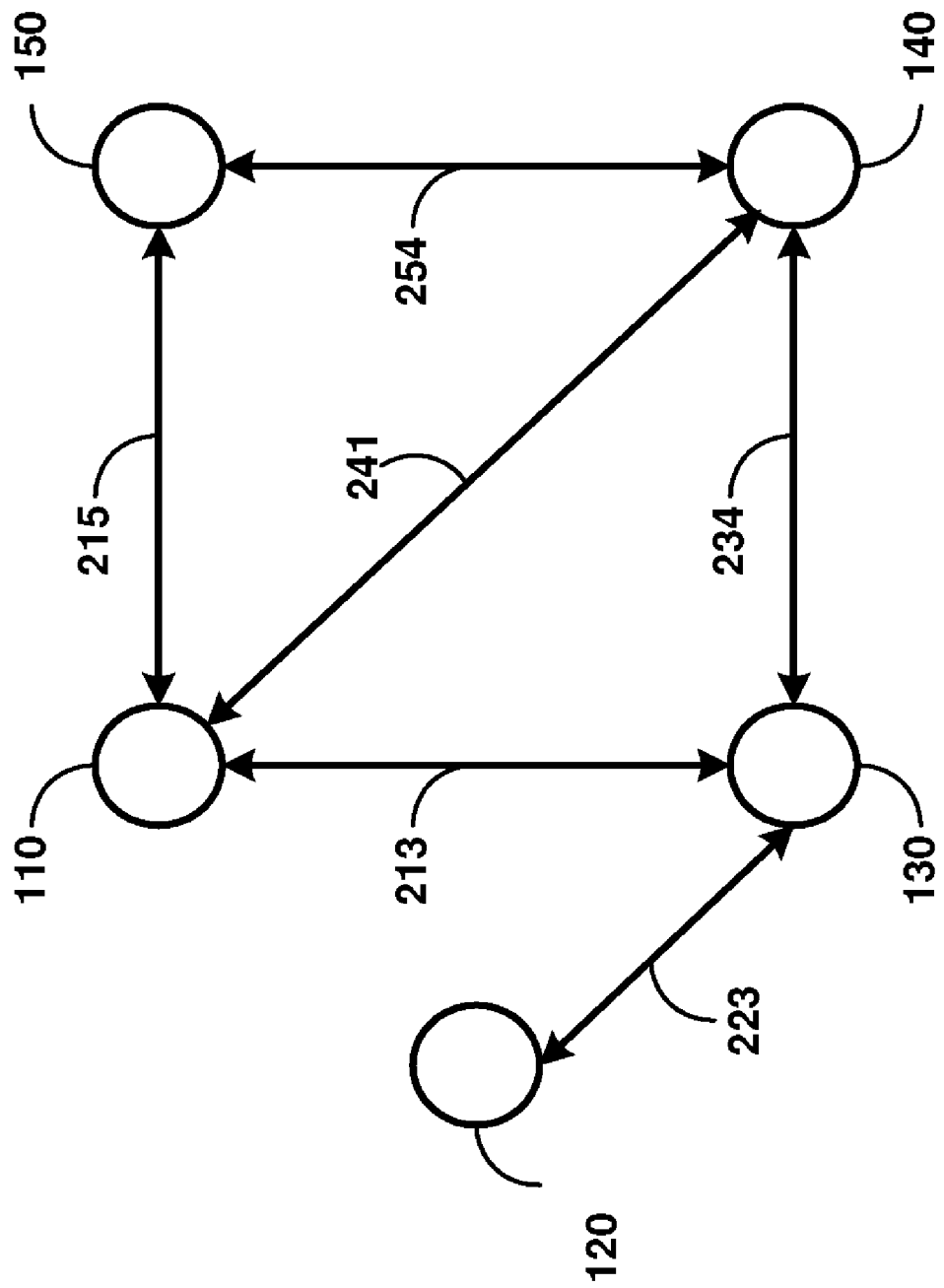
FIGS. 4A, 4B and 4C are diagrams illustrating network topologies considered in determining routes from a source node to destination nodes in one embodiment.

The steps illustrated above are further clarified below with reference to an example scenario illustrated with respect to FIGS. 4A, 4B, and 4C, and the table of FIG. 5.

EXAMPLE

An example scenario is described below with respect to the overlay network of FIG. 2, and FIGS. 4A, 4B and 4C as well as table 500 of FIG. 5.

In the following example, it is assumed that a data payload of 2 Megabits is to be sent from node 120 to each of nodes 110, 130, 140 and 150. Three values (settings) for the threshold bandwidth are considered. Also, the following bandwidths and latencies (per definitions/approximations, described above) are assumed, merely for illustration, for the paths in FIG. 2:

path 221—Bandwidth=128 kilobits/second (Kbps), Latency=120 milliseconds (ms)
path 213—1 Megabits/second (Mbps), 120 ms
path 223—1 Mbps, 120 ms
path 215—256 Kbps, 10 ms
path 234—512 Kbps, 20 ms
path 241—2 Mbps, 240 ms
path 254—1 Mbps, 120 ms Node 110 receives the identities (e.g., addresses) of nodes 120, 130, 140 and 150, and also the corresponding bandwidths and latencies of paths as noted above. Node 110 creates an overlay network (as shown in FIG. 2) of the nodes and paths. The list of paths including the corresponding bandwidths and latencies may be determined in a known way.

Node 110 forms a network topology containing nodes 110 through 150, and interconnected by paths whose bandwidths exceed a chosen current value of threshold bandwidth. As an example, node 110 may set the current threshold bandwidth to 128 Kbps, and form a network topology as shown in FIG. 4A, which contains only paths whose bandwidths exceed 128 Kbps (path 221 is not considered as it has a bandwidth of 128 Kbps).

Node 110 determines a route from node 120 to each of destination nodes 110, 130, 140 and 150 which provides least aggregate latency (assuming the corresponding destination node is still connected to node 120 by a route even after removal of paths having bandwidths less than the threshold bandwidth). From FIG. 4A, the least-aggregate-latency routes are:

(Route A1):
Node 120 to node 110: path 223-path 213 (aggregate latency—240 ms)
(Route A2):
Node 120 to node 130: path 223 (aggregate latency—120 ms)
(Route A3):
Node 120 to node 140: path 223-path 234 (aggregate latency—140 ms)
(Route A4):
Node 120 to node 150: path 223-path 213-path 215 (aggregate latency—250 ms)

Figure 5:
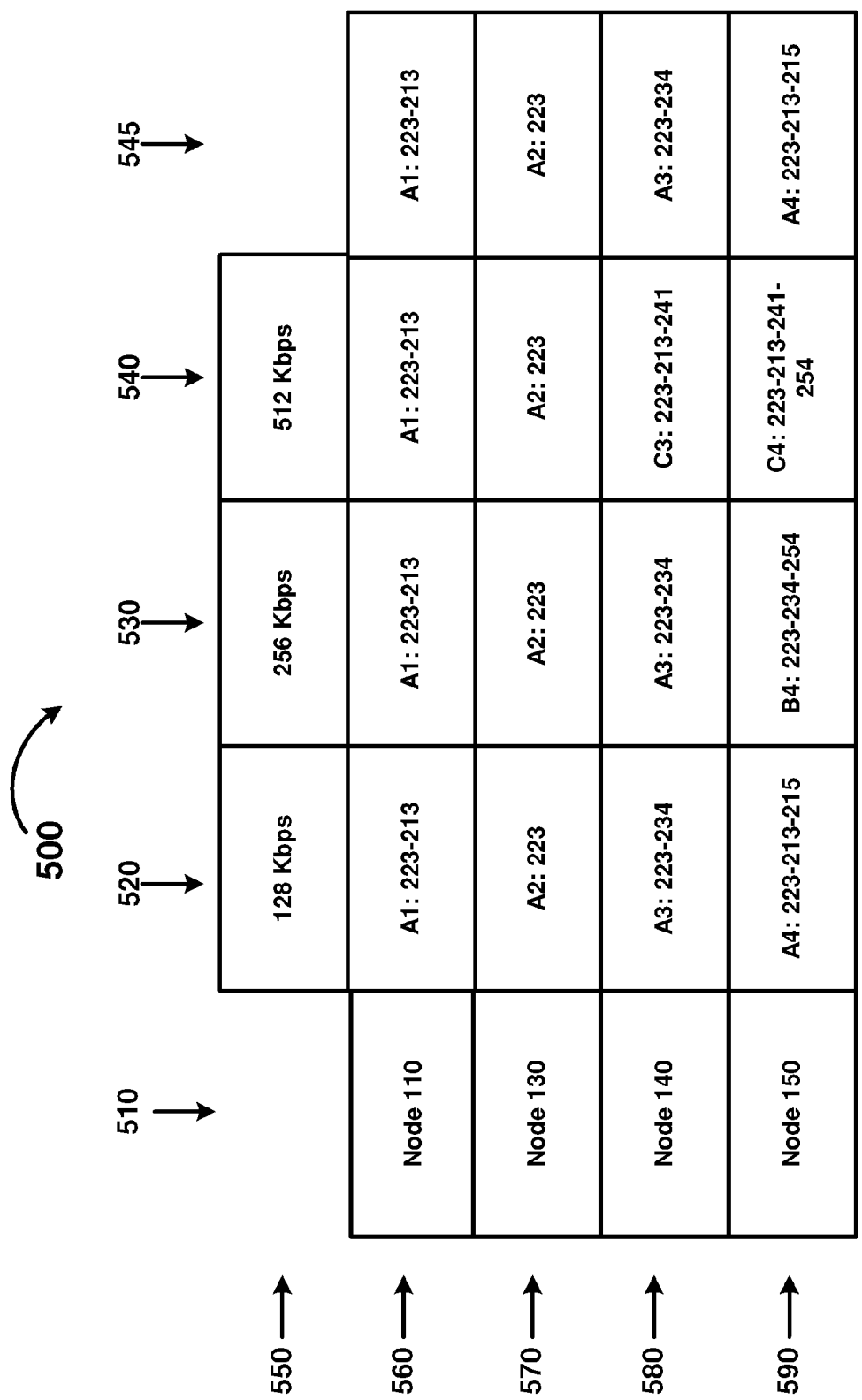
FIG. 5 is a diagram of a table used to store routes computed to destination nodes for various values of threshold bandwidth.

Node 110 stores the above paths to each destination node in column 520 in table 500 (FIG. 5). As may be readily observed, each of rows 560, 570, 580 and 590 contains the various data points (routes) computed in step 340 corresponding to a single destination node. The destination nodes are listed in column 510, and columns 520, 530 and 540 contain data point entries for corresponding values 128 Kbps (column 520), 256 Kbps (column 530) and 512 Kbps (column 540) of the threshold bandwidth noted in row 550.

Figure 4C:
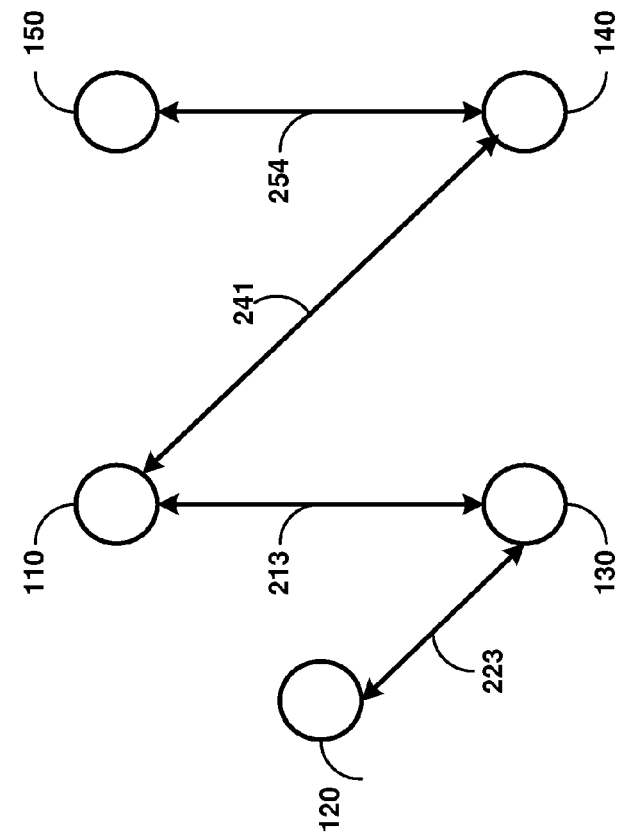
Figure 4B:
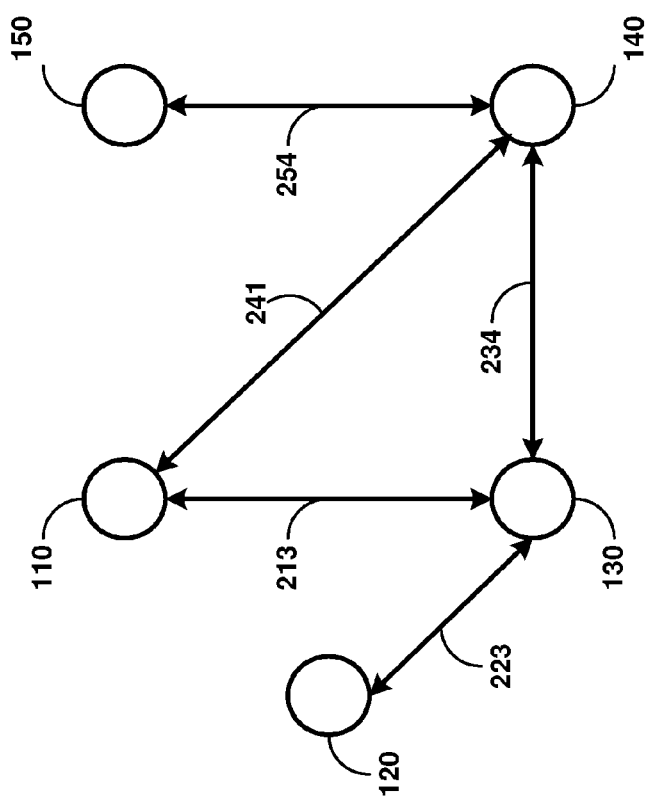

Node 110 sets a new value of 256 Kbps for the (current) threshold bandwidth, and forms a network topology containing only paths whose bandwidth exceeds 256 Kbps, as shown in FIG. 4B (path 215 is not considered as it has a bandwidth of 256 Kbps).

Again, node 110 determines a route from node 120 to each of destination nodes 110, 130, 140 and 150 which provides least aggregate latency. From FIG. 4B, the least-aggregate-latency routes for the current value of threshold bandwidth 256 Kbps are:

(Route A1):
Node 120 to node 110: path 223-path 213 (aggregate latency—240 ms)
(Route A2):
Node 120 to node 130: path 223 (aggregate latency—120 ms)
(Route A3):
Node 120 to node 140: path 223-path 234 (aggregate latency—140 ms)
(Route B4):
Node 120 to node 150: path 223-path 234-path 254 (aggregate latency—260 ms)

Node 110 stores the above paths to each destination node in column 530, as shown.

Node 110 sets a new value of 512 Kbps for the (current) threshold bandwidth, and forms a network topology containing only paths whose bandwidths exceed 512 Kbps, as shown in FIG. 4C (path 234 is not considered as it has a bandwidth of 512 Kbps).

Again, node 110 determines a route from node 120 to each of destination nodes 110, 130, 140 and 150 which provides least aggregate latency. From FIG. 4C, the least-aggregate-latency routes (in this case there is only one route to each destination node) for the current value of threshold bandwidth 512 Kbps are:

(Route A1):
Node 120 to node 110: path 223-path 213 (aggregate latency—240 ms)
(Route A2):
Node 120 to node 130: path 223 (aggregate latency—120 ms)
(Route C3):
Node 120 to node 140: path 223-path 213-path 241 (aggregate latency—480 ms)
(Route C4):
Node 120 to node 150: path 223-path 213-path 241-path 254 (aggregate latency—600 ms)

Node 110 stores the above paths to each destination node in column 540.

Node 110 then computes the fastest route to each destination from the three sets of least-aggregate-latency routes determined above using equation 1 as given below:

Node 120 to node 110: Since A1 (path 223-path 213) is obtained for all values of the threshold bandwidth, A1 (path 223-path 213) is provided as the fastest route.

Node 120 to node 130: Since A2 (path 223) is obtained for all values of the threshold bandwidth, A2 (path 223) is provided as the fastest route.

Node 120 to node 140: The faster of the routes A3 (path 223-path 234) and C3 (path 223-path 213-path 241) is determined as per equation 1 (described with respect to step 380 in the flowchart of FIG. 3). It may be verified that for the assumed data payload size of 2 Megabits, route A3 (path 223-path 234) results in a total time "T" (equation 1) of 144 ms, while route C3 (path 223-path 213-path 241) results in total time "T" of 482 ms. Thus, A3 (path 223-path 234) is provided as the fastest route.

Node 120 to node 150: The fastest of the routes A4 (path 223-path 213-path 215), B4 (path 223-path 234-path 254) and C4 (path 223-path 213-path 241-path 254) is determined as per equation 1. It may be verified that for the assumed data payload size of 2 Megabits, route A4 (path 223-path 213-path 215) results in a total time "T" of 258 ms, route B4 (path 223-path 234-path 254) results in a total time "T" of 364 ms, and route C4 (path 223-path 213-path 241-path 254) results in a total time "T" of 600 ms. Thus, A4 (path 223-path 213-path 215) is provided as the fastest route. The fastest routes thus computed may be stored, as shown in column 545 of table 5 (FIG. 5).

It may be noted that for different payload sizes the fastest routes determined may be different from those noted above.

Having thus determined the fastest routes to each destination node, it may be desirable to use some of the nodes as relay nodes to the extent there are overlapping paths. The desired relays/transmissions may be represented in the form of a graph as described below.

Data Dissemination Graph

Figure 6:
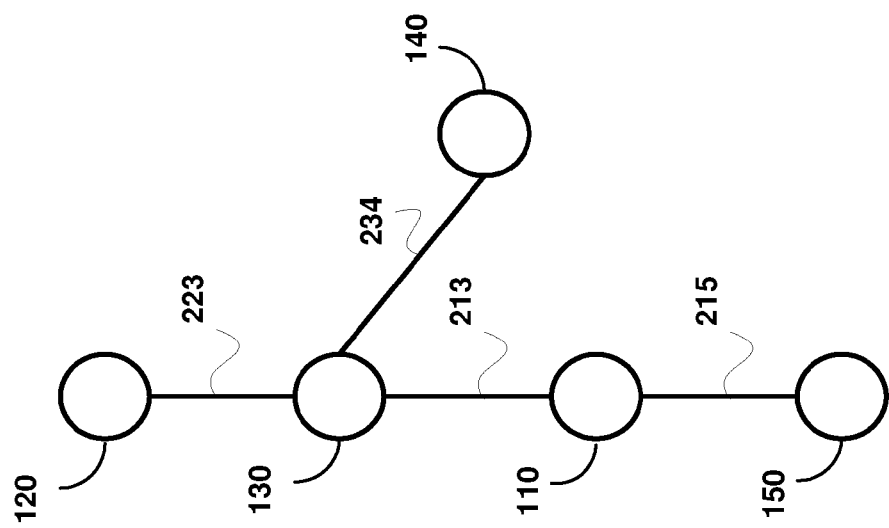
FIG. 6 is a diagram of a data dissemination graph specifying the fastest routes provided to various nodes.

FIG. 6 is a data dissemination graph corresponding to the fastest routes determined in FIG. 5 noted above. The data dissemination graph indicates the specific nodes to which each node has to forward the received data. As may be readily observed from column 545 above, source node 120 needs to merely send one unicast transmission on path 223 to node 130. Node 130 in turn needs to send unicast transmissions on paths 213 and 234 to respective nodes 110 and 140. Node 110 has to further relay to node 150 via path 215.

The entire data dissemination graph may be provided to each of the nodes so that the desired relays are obtained. Alternatively, only that portion of the graph as relevant to each node may be sent in the form of appropriate instructions (either along with the data transmission or out of band).

Thus, each node may perform any necessary relay to the other nodes, to ensure that the data is delivered to all nodes.

Also, while the routes of above are described as being based on various paths, which are based on links, merely for illustration, each path can also represent a point-to-point link or via several switches of a network, as will be apparent to one skilled in the relevant arts.

It should be appreciated that the approaches described above may be implemented in a combination of one or more of hardware, software and firmware, as suited for the specific environment. The description is continued with respect to an embodiment in which various features are operative by execution of corresponding software instructions.

Software Implementation

Figure 7:
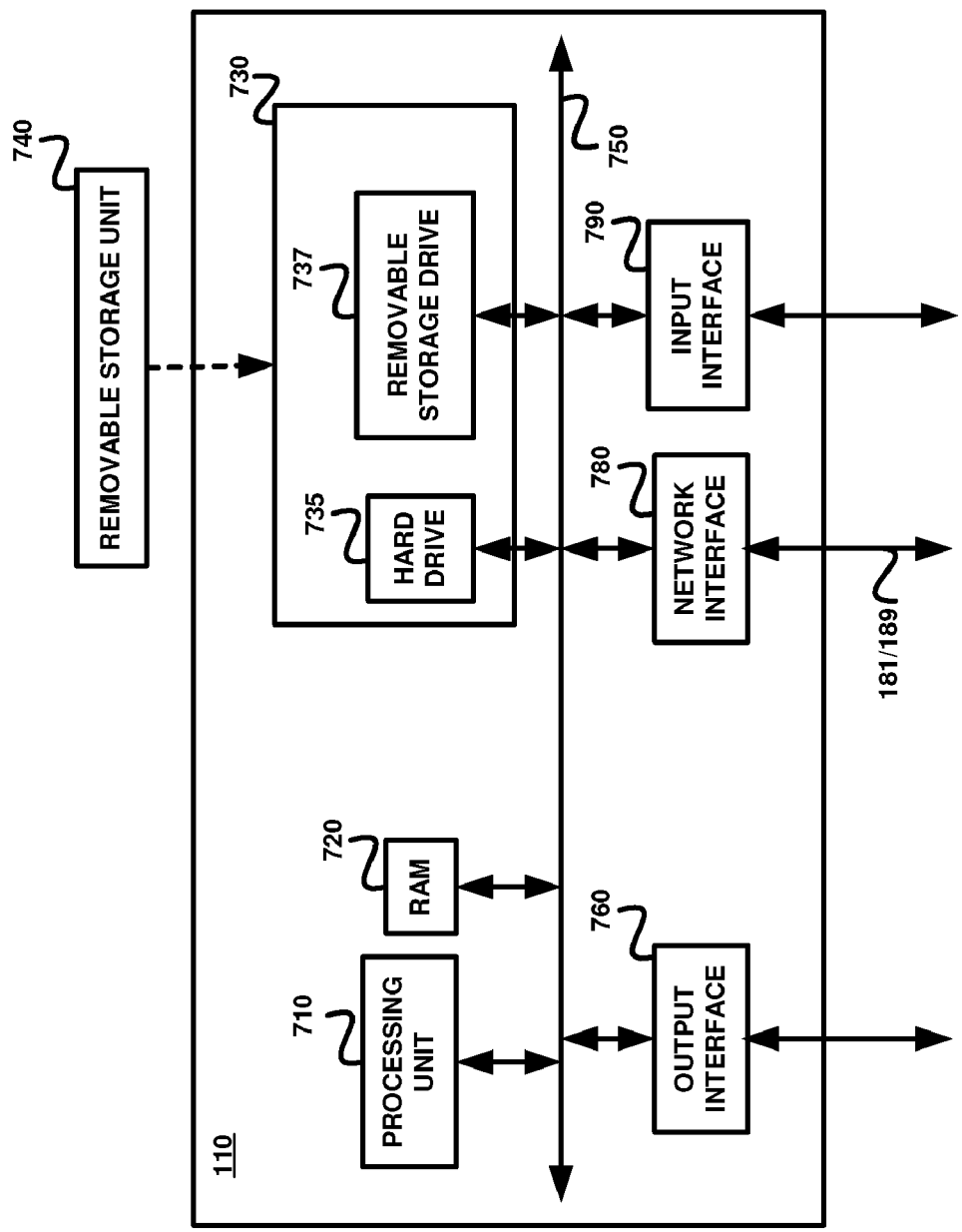
FIG. 7 is a block diagram illustrating an embodiment of a node in which several features of the present invention are operative upon execution of appropriate software instructions.

FIG. 7 is a block diagram illustrating the details of node 110 (or any digital processing system in general) in one embodiment. Node 110 is shown containing processing unit 710, random access memory (RAM) 720, storage (secondary memory) 730, output interface 760, network interface 780 and input interface 790. Each block is described in further detail below.

Output interface 760 provides output signals (e.g., display signals to a display unit, not shown) which can form the basis for a suitable interface for an administrator to configure node 110, and for an attendee/presenter to view the presented information. Input interface 790 (e.g., interface with a key-board and/or mouse, not shown) enables a user/administrator to provide any necessary inputs (e.g., questions/comments) which may then be transmitted to another node.

Network interface 780 enables node 110 to send and receive data on communication networks, and thus to other nodes. Network interface 780, output interface 760 and input interface 790 may be implemented in a known way.

RAM 720 and storage 730 may together be referred to as a memory. RAM 720 receives instructions and data on bus 750 from storage 730, and provides the instructions to processing unit 710 for execution. Table 500 of FIG. 5 may be stored in RAM 720.

Secondary memory 730 may contain units such as hard drive 735 and removable storage drive 737. Secondary storage 730 may store the software instructions and data, which enable node 110 to provide several features in accordance with the present invention. While secondary memory 730 is shown contained within node 110, an alternative embodiment may be implemented with the secondary memory 730 implemented external to node 110, and the software instructions (described below) may be provided using network interface 780.

Some or all of the data and instructions may be provided on removable storage unit 740 (or from a network using protocols such as Internet Protocol), and the data and instructions may be read and provided by removable storage drive 737 to processing unit 710. Floppy drive, magnetic tape drive, CD_ROM drive, DVD Drive, Flash memory, removable memory chip (PCMCIA Card, EPROM) are examples of such removable storage drive 737.

Processing unit 710 may contain one or more processors. Some of the processors can be general purpose processors which execute instructions provided from RAM 720. Some can be special purpose processors adapted for specific tasks (e.g., for memory/queue management). The special purpose processors may also be provided instructions from RAM 720.

In general processing unit 710 reads sequences of instructions from various types of memory media (including RAM 720, storage 730 and removable storage unit 740), and executes the instructions to provide various features of the present invention. In general, each of the memory units represents a machine readable medium (removable or not, volatile or non-volatile) from which processing unit 710 reads the instructions to provide the features described above.

Though the computer readable medium is shown as being used within the system of FIG. 7, it should be appreciated that the corresponding memory units may be provided from external to such systems, and accessible, for example, over a network.

Furthermore, the instructions on the computer readable medium can be executed by a group of networked digital computer systems to provide various features described above.

Conclusion

While various embodiments of the present invention have been described above, it should be understood that they have been presented by way of example only, and not limitation. Thus, the breadth and scope of the present invention should not be limited by any of the above described embodiments, but should be defined only in accordance with the following claims and their equivalents.

What is claimed is:

1. A method of determining a first route between a source node and a first destination node, said source node and said first destination node being connected by a network, said network containing a plurality of paths and a plurality of network nodes, with each path being provided between a pair of network nodes, said method comprising:
   receiving identities of said source node and said first destination node, as well as bandwidths of each of said plurality of paths;
   forming a first network topology containing only those of said plurality of paths with said bandwidths in a first value range;
   forming a second network topology containing those of said plurality of paths with said bandwidths in a second value range;
   selecting a first set of paths in said first network topology and a second set of paths in said second network topology, said first set of paths and said second set of paths being contained in said plurality of paths;
   estimating a first total time to transfer an amount of data based on said first set of paths and a second total time to transfer said amount of data based on said second set of paths;
   determining said first route as being formed by said first set of paths only if said first total time is less than said second total time and as being formed by said second set of paths otherwise.

2. The method of claim 1, wherein said receiving also receives latencies of each of said plurality of paths, wherein said first set of paths is selected from said first network topology such that said first set of paths provides a least latency route between said source node and said destination node among all possible paths in said first network topology,
   wherein said second set of paths is selected from said second network topology such that said second set of paths provides a least latency route between said source node and said first destination node among all possible paths in said second network topology.

3. The method of claim 2, wherein a respective route is to be determined for each of a plurality of destination nodes including said first destination node, wherein said respective route is determined from said first network topology by treating each destination node as said first destination node.

4. The method of claim 2, wherein said first total time (T) is determined according to a formula:

$$T = \sum_{i=1}^{k} \text{latency}(i) + \frac{\text{Size}}{\text{Bottleneck\_BW}} + \sum_{j=1}^{k-1} \text{relaying\_delay}(j)$$

Wherein
$\Sigma$ represents a summation operator;
   i=an iteration index running from 1 to k, wherein k represents a number of paths in said first set of paths;
   j=an iteration index running from 1 to (k−1), wherein (k−1) represents a number of intermediate nodes in said first set of paths;
latency(i)=the latency associated with the path 'i';
Size = said amount of data;
Bottleneck_BW =the least of the bandwidths of said first set of paths;
relaying_delay =delay at jth intermediate node due to relaying of data from corresponding incoming link to outgoing link.

5. The method of claim 1, wherein a second route is to be determined from said source node to a second destination node connected to said network, wherein said second destination node is configured to operate as a relay node, wherein said determining determines that said second route is formed by a third set of paths contained in said plurality of paths, said method further comprising:
   checking whether said first set of paths is via said second destination node; and
   sending data to said second destination node along with an instruction to relay said data to said first destination node,
   whereby said data is sent by said source node only to said second destination node, but said first destination node also receives said data.

6. The method of claim 1, wherein said first value range is set to be greater than or equal to a first bandwidth and said second value range is set to be greater than or equal to a second bandwidth, wherein said first bandwidth and said second bandwidth represents bandwidths of respective paths.

7. A non-transitory computer readable medium carrying one or more sequences of instructions for causing a system to determine a first route between a source node and a first destination node, said source node and said first destination node being connected by a network, said network containing a plurality of paths and a plurality of network nodes, with each path being provided between a pair of network nodes, wherein execution of said one or more sequences of instructions by one or more processors contained in said system causes said one or more processors to perform the actions of:
   receiving identities of said source node and said first destination node, as well as bandwidths and latencies of each of said plurality of paths;
   forming a first network topology containing only those of said plurality of paths with one of either said bandwidths or said latencies in a first value range;
   selecting a first set of paths, which provides a route between said source node and said first destination node, said first set of paths providing a maximum bandwidth route if said first network topology is formed based on latency, said first set of paths providing a minimum latency route if said first network topology is formed based on bandwidth;

adding said first set of paths to a potential set of routes between said source node and said first destination node;

repeating said forming, said selecting and said adding using a second value range instead of said first value range, to add a second set of paths to said potential set of routes;

and selecting one of said potential set of routes as said first route between said source node and said destination node, wherein said selected route transfer an amount of data in least amount of time among said potential set of routes.

8. The computer readable medium of claim 7, wherein a respective route is to be determined for each of a plurality of destination nodes including said first destination node, wherein said respective route is determined from said first network topology by treating each destination node as said first destination node.

9. The computer readable medium of claim 8, wherein said one of either said bandwidths or said latencies is bandwidths such that said first set of paths are selected to minimize latency for said first route.

10. A digital processing system comprising:
a processor;
a random access memory (RAM);
a machine readable medium to store one or more instructions which when retrieved into said RAM and executed by said processor enables said processor to determining a first route between a source node and a first destination node, said source node and said first destination node being connected by a network, said network containing a plurality of paths and a plurality of network nodes, with each path being provided between a pair of network nodes, said processor operable to perform the actions of:

receiving identities of said source node and said first destination node, as well as bandwidths of each of said plurality of paths;

forming a first network topology containing only those of said plurality of paths with said bandwidths in a first value range;

forming a second network topology containing those of said plurality of paths with said bandwidths in a second value range;

selecting a first set of paths in said first network topology and a second set of paths in said second network topology, said first set of paths and said second set of paths being contained in said plurality of paths;

estimating a first total time to transfer an amount of data based on said first set of paths and a second total time to transfer said amount of data based on said second set of paths;

determining said first route as being formed by said first set of paths only if said first total time is less than said second total time and as being formed by said second set of paths 11. The digital processing system of claim 10, wherein said processor is further operable to perform the actions of:

receiving latencies of each of said plurality of paths, wherein said first set of paths is selected from said first network topology such that said first set of paths provides a least latency route between said source node and said destination node among all possible paths in said first network topology, wherein said second set of paths is selected from said second network topology such that said second set of paths provides a least latency route between said source node and said first destination node among all possible paths in said second network topology.

* * * * *

UNITED STATES PATENT AND TRADEMARK OFFICE
CERTIFICATE OF CORRECTION

PATENT NO.         : 8,279,753 B2
APPLICATION NO.    : 11/678618
DATED              : October 2, 2012
INVENTOR(S)        : Singh It is certified that error appears in the above-identified patent and that said Letters Patent is hereby corrected as shown below:

On page 2, in column 1, under "Other Publications", line 20, delete "Peermulticast" and insert -- Peer multicast --, therefor.

On page 2, in column 2, under "Other Publications", line 29, delete "USNIX" and insert -- USENIX --, therefor.

In column 1, line 63, after "FIG." delete "(FIG.)".

In column 6, line 51, after ""Size"" insert -- . --.

In column 6, line 60, after "link" insert -- . --.

In column 14, line 23, in Claim 10, after "paths" insert -- otherwise. --.

Signed and Sealed this
Twenty-fifth Day of December, 2012

David J. Kappos
*Director of the United States Patent and Trademark Office*